United States Patent

[11] 3,599,749

| [72] | Inventor | Victor Millman |
| | | San Diego, Calif. |
| [21] | Appl. No. | 845,229 |
| [22] | Filed | July 28, 1969 |
| [45] | Patented | Aug. 17, 1971 |
| [73] | Assignee | Rohr Corporation |
| | | Chula Vista, Calif. |

[54] JET NOISE CONTROL SYSTEM
18 Claims, 4 Drawing Figs.

[52] U.S. Cl. .................................................. 181/33 HC,
181/43, 239/127.3, 239/265.17
[51] Int. Cl. ...................................................... F01n 1/14,
B64d 33/06
[50] Field of Search ............................................ 239/127.3,
265.17, 265.11, 265.13, 265.23; 181/43, 51, 33, 33.22, 33.221, 33.222

[56] References Cited
UNITED STATES PATENTS

| 2,426,833 | 9/1947 | Lloyd .......................... | 181/33.221 |
| 2,934,889 | 5/1960 | Poulos ......................... | 181/33.221 |
| 2,957,310 | 10/1960 | Hyde ........................... | 239/265.17 |
| 2,990,905 | 7/1961 | Lilley .......................... | 181/33.221 |
| 3,002,341 | 10/1961 | Muzzy et al. ................. | 181/33.221 |
| 3,027,710 | 4/1962 | Maytner ....................... | 239/127.3 |
| 3,041,836 | 7/1962 | Truman et al. ............... | 181/33.22 |
| 3,053,340 | 9/1962 | Kutney ......................... | 181/33.221 |

FOREIGN PATENTS

| 1,157,063 | 12/1957 | France ......................... | 181/33.221 |
| 1,254,777 | 1/1961 | France ......................... | 181/33.221 |

*Primary Examiner*—Robert S. Ward, Jr.
*Attorney*—George E. Pearson

ABSTRACT: Jet engine exhaust nozzle is surrounded at its exit margin with multiplicity of small jet discharge ducts which direct discrete small jets of gas rearwardly in a ring surrounding the jetstream. These jets intercept the expanding boundary of the jetstream immediately behind the nozzle and produce small eddy turbulence with lower sound energy level and higher frequency level. Gas is supplied by bleed from compressor or turbine through shell surrounding nozzle. In form shown, tailpipe boundary layer is drawn off to improve engine efficiency. Gas jets travel at velocity between those of jetstream and free air, reducing shearing forces and consequent sound energy and producing two mixing zones.

INVENTOR.
VICTOR MILLMAN
BY Edwin D. Grant
ATTORNEY

JET NOISE CONTROL SYSTEM

BACKGROUND OF THE INVENTION

This invention lies in the field of sound suppression of gas turbine or jet engines, which produce reaction thrust by ejecting a high velocity stream of gas from the exhaust nozzle or tail pipe of the gas turbine. One of the problems of airplanes equipped with jet engines on which a great deal of effort has been expended is that the exhaust stream creates a very high level of sound energy or "noise" in a wide range of frequencies, and a portion of this noise reaches the ground from low flying airplanes, as during takeoff and climb, at an energy level which is not acceptable to the public.

The invention is directed to a system of the general type which functions to mix the boundary of the jetstream with other gas or air supplied by the engine as well as with the free airstream. Various types of systems have been proposed and tried with this end in mind but they have not succeeded in substantially reducing the quantity of low frequency sound energy which is most objectionable and which is the most difficult to attenuate.

SUMMARY OF THE INVENTION

The present invention provides a very satisfactory solution to this problem with a minimum of equipment and with no moving parts which would require any servicing. Generally stated, the system includes a multiplicity of very small jet discharge ducts arranged around the periphery of the jet exhaust nozzle and means to provide them with gas for rearward discharge. As is well known, the jetstream from the nozzle has a gradually expanding boundary. The ducts are rearwardly directed at such an angle as to intercept the expanding boundary at series of loci around the periphery. Since these jets are very small, the produce turbulence when contacting the jetstream boundary in the form of correspondingly small eddies which produce less sound energy at a higher frequency level.

The ducts, in the presently preferred form, are defined by corrugations in the aft portion of a shell which surrounds the nozzle in spaced relation form a conduit. The troughs of the corrugations contact the outer wall of the nozzle to form the peripheral series of discrete discharge ducts. The forward portion of the shell is formed as a continuation of the tailpipe, and the forward end of the nozzle is inwardly spaced to form an annular flow passage for gas to pass into the interior of the shell and rearward to the ducts.

The primary source of gas for the ducts is the boundary layer of the exhaust gas flowing through the tailpipe. Removal of the boundary layer at the forward end of the nozzle improves the efficiency of the engine. Since the gas comes from the boundary layer and passes through rather restricted conduit and ducts, it issues at a velocity lower than that of the jetstream and higher than that of the free stream air. This produces two mixing zones, each with reduced shear rates, with the result that the sound power level is lower and the frequency level higher than would result otherwise. The separation of the mixing gas into very small discrete jets of gas particularly enhances the production of small eddy turbulence and low sound energy levels.

BRIEF DESCRIPTION OF THE DRAWINGS

Various other advantages and feature of novelty will become apparent as the description proceeds in conjunction with the accompanying drawing, in which.

DESCRIPTION OF PREFERRED EMBODIMENT

Figure 1:
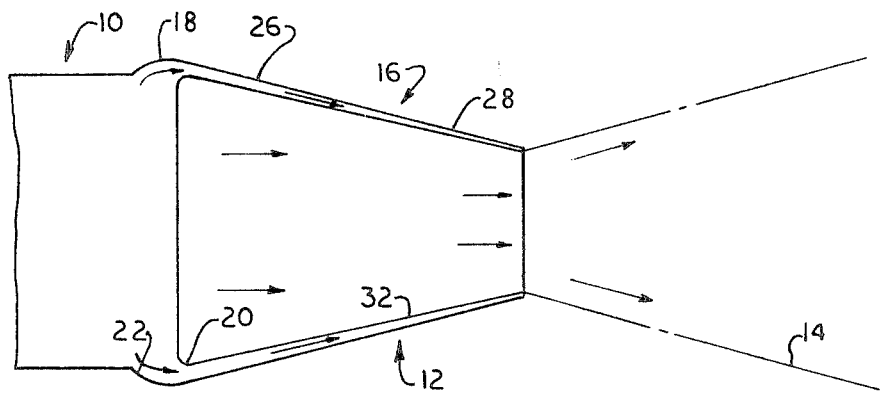
FIG. 1 is a schematic side elevational view in section of the assembly incorporating the invention.

The general arrangement illustrated in FIG. 1 shows the relative arrangement of the parts making up the sound suppression system. An engine, not shown, includes a compressor and a turbine which delivers exhaust gas through tail pipe !0 to nozzle 12 which discharges the gas rearwardly in a jetstream having an expanding boundary indicated by lines 14 A shell 16 surrounds the nozzle in spaced relation to form a conduit and is formed as a continuation to tailpipe 10, being joined thereto by an annular outwardly convex section 18. The nozzle terminates at forward end 20 substantially coplanar with section 18 to form an annular passage 22 for gas to flow from the tailpipe into the annulus between the nozzle and the shell at the forward end of the latter. Because of the relative location of the parts, the boundary layer along the inner wall of the tailpipe passes into the aforesaid annulus and improves the efficiency of flow through the nozzle with consequent improvement of the efficiency of the engine.

Figure 3:
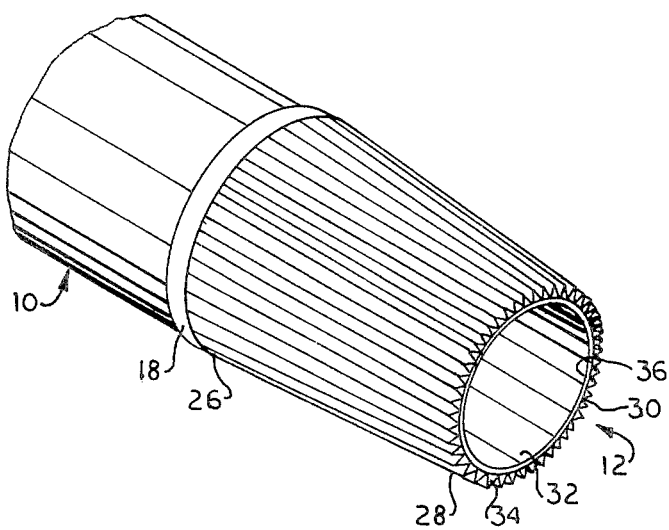
FIG. 3 is a schematic perspective view of the nozzle showing the external configuration.

The configuration of the shell is shown in FIG. 3, where it will be seen that the major part is corrugated, starting near the forward end 26, the corrugations gradually deepening as they approach the aft end 28, where the troughs 30 contact the outer wall of the aft end 32 of the nozzle, thus forming a multiplicity of discrete jet discharge ducts 34, which are generally triangular in shape but may take other desired form. Preferably but not necessarily the ducts terminate at the exit margin 36 of the nozzle.

Figure 2:
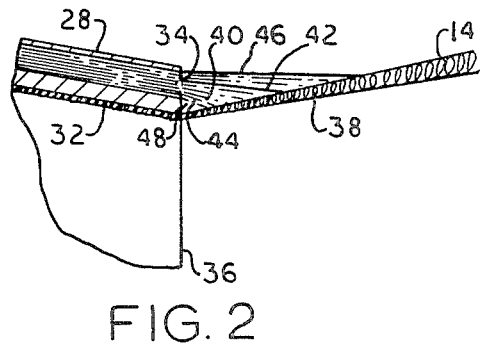
FIG. 2 is a schematic side elevational view in section showing the operation of the invention.

As will be seen in FIG. 2, a second boundary layer 38 has been formed in the nozzle and develops small eddies as it leaves exit margin 36. In the absence of the invention, these eddies would increase rapidly in size an noise production as they make shearing contact with the free stream air. However, the multiplicity of very small discrete jets 40, traveling on an interception course, strike the boundary of the jetstream immediately downstream of exit margin 36 and cause intimate mixing of separate portions of the boundary to maintain the small eddies. This is partially due to the fact that the jets are traveling at a high velocity although it is somewhat lower than that the jetstream.. At the same time it is higher than the velocity of the free stream air so that velocity transition zone 42 is formed having inner and outer boundaries 44 and 46, each of which defines a separate mixing zone. Since the shearing rates in each of these mixing zones are lower than the shearing rate between the jetstream and the free airstream, the resultant nose level is lower and the noise frequency level is higher, both of which contribute to reduction of the noise transmitted to the ground.

Ducts 34 are radially spaced from the inner wall of the nozzle and form an initial mixing zone 48 of generally triangular cross section in which some larger eddies may form as a result of the escape of the gas from the nozzle. These eddies are immediately broken down to smaller size as they reach the point of contact between the jetstream boundary and the discrete jets.

The system as shown makes use of bleed gas from the exhaust gas discharge by the turbine. However, compressor bleed air may be used by extending shell 16 farther forward or by providing suitable conduit means to transmit compressor air to the shell. It will be apparent that, since the system is based on intercepting the jetstream boundary by multiple discrete jets, it may be equally well applied to nozzles having forms other than circular, including the well-known daisy-type nozzle.

Figure 4:
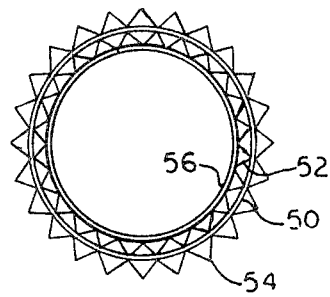
FIG. 4 is a schematic ear elevation of a second embodiment of the invention.

In the embodiment of the invention illustrated in FIG. 4, a sleeve 50 is fixed in position around an inner shell 52, the latter being formed with longitudinally extending corrugations the crests of which abut the inner surface of the sleeve. A second longitudinally corrugated shell 54 is fixed in position around sleeve 50 and its troughs contact the outer surface thereof just as the troughs of the inner shell contact the outer surface of a nozzle 56. Thus the corrugations of the inner and outer shells provide two sets of concentrically disposed ducts both of which are in communication with a jet engine tailpipe (no shown) at the forward end of nozzle 56, so that a portion of the exhaust gas discharged through the tailpipe enters said ducts and issues therefrom at he aft ends of shells in the form of two series of concentrically disposed jets. Preferably the velocity of the jets issuing from the ducts formed by the corrugations of sell 54 is intermediate he velocity of the free airstream and the velocity of the jets issuing from the ducts formed by the corrugations of shell 52, thus reducing the relative velocities at the boundaries between the free airstream, the two sets of jets issuing from the shells, and the jet stream issuing from nozzle 56. As in the case of the first-described embodiment of the invention, the ducts formed by the corrugations of shells 52 and 54 may be supplied with compressor bleed air rather than bleed gas from the exhaust gas discharged from the turbine of the jet engine.

Having thus described the invention what I claim as new and useful and desired to be secured by U.S. Letters Patent IS:

1. A jet noise control system comprising: a nozzle adapted to receive the exhaust gas emitted through a tailpipe from the turbine of a jet engine and discharge it rearwardly in an expanding jetstream; and multiple duct means associated with the nozzle and constructed and arranged in surrounding relation thereto and in gas-receiving relation to the tailpipe to receive boundary layer gas therefrom and direct the same in a multiplicity of small jets of gas rearwardly of the nozzle to intercept the boundary of the jetstream at a multiplicity of loci around the periphery of the jetstream and immediately downstream of the exit margin of the nozzle to create turbulence in the jetstream boundary in the form of small eddies of high noise frequency level.

2. A system as claimed in claim 1; including means to supply bleed gas from the engine to constitute the source of said small jets of gas.

3. A system claimed in claim 2; said bleed gas being bleed exhaust gas from the turbine of the jet engine.

4. A system as claimed in claim 2; said bleed gas being bleed air from the compressor of the jet engine.

5. A system as claimed in claim 1; including means to discharge said jets of gas rearwardly at a velocity intermediate between the velocity of the jetstream and the velocity of the free airstream.

6. A system as claimed in claim 1; said means for directing radially jets comprising a multiplicity of jet nozzle ducts located around the periphery of the outer wall ring the jets adjacent the exit margin thereof; each duct being generally parallel to the adjacent duct and arranged to discharge rearwardly along an interception course with a portion of the jetstream boundary.

7. A system as claimed in claim 6; said ducts being arranged to form a rearwardly converging frustum.

8. A system as claimed in claim 6; said ducts being spaced radially outward of the inner wall of the nozzle to define an initial mixing zone surrounded by a ring of jets issuing from said ducts.

9. A system as claimed in claim 6; the discharge area of each duct being not more than about 1 percent of the discharge area of the nozzle.

10. A system as claimed in claim 6; the discharge area of each duct being in the range of 0.1 percent to 1.0 percent of the discharge area of the nozzle.

1 A jet noise control system comprising: a nozzle adapted to receive the exhaust gas emitted by the turbine of a jet engine and discharge it rearwardly in an expanding jetstream; means associated with the nozzle and constructed and arranged to direct a multiplicity of small jets of gas rearwardly to intercept the boundary of the jetstream at a multiplicity of loci around the intercept the boundary of the jetstream at a multiplicity of loci around the periphery of the jetstream and immediately downstream of the exit margin of the nozzle to create turbulence in the jetstream boundary in the form of small size eddies of high noise frequency level, said means for directing said jets comprising a multiplicity of jets discharge ducts located around the periphery of the outer wall of the nozzle adjacent the exit margin thereof; each duct being generally parallel to the adjacent duct and arranged to discharge rearwardly along an interception course with a portion of the jet stream boundary, a tailpipe extending forwardly from the forward end of the nozzle; an means to bleed boundary layer gas from the tailpipe at the juncture of the tailpipe and the forward end of the nozzle and deliver it to said ducts for discharge therefrom.

12. A system as claimed in claim 11, said ducts being arranged so that said jets are discharged in concentric sets.

13. A system as claimed in claim 12 wherein the jets in at least one of said sets have a velocity different from that of the jets in another of said sets.

14. A jet noise control system comprising: a nozzle adapted to receive the exhaust gas emitted by the turbine of jet engine and discharge it rearwardly in an expanding jetstream; means associated with the nozzle and constructed and arranged to direct a multiplicity of small jets of gas rearwardly to intercept the boundary of the jetstream at a multiplicity of loci around the periphery of the jetstream and immediately downstream of the exit margin of the nozzle to create turbulence in the jetstream boundary in the form of small size eddies of high noise frequency level, said means for directing said jets comprising a multiplicity of jet discharge ducts located around the periphery of the outer wall of the nozzle adjacent the exit margin thereof; each duct being generally parallel to the adjacent duct and arranged to discharge rearwardly along an interception course with a portion of the jetstream boundary, a tailpipe extending forwardly from the forward end of the nozzle, a shell surrounding the outer wall of the nozzle in spaced relation to form a conduit connected at its aft end to said ducts; and passage means at the juncture of the tailpipe and the forward end of the nozzle in flow communication with the interior of said shell to supply gas for discharge from said ducts.

15. A system as claimed in claim 14; the aft end of said shell being corrugated with the troughs of the corrugations in engagement with the outer wall of the nozzle to form said ducts.

16. A system as claimed in claim 15; including a sleeve fixed in position around said shell and a second corrugated shell fixed in position around said sleeve, the troughs of the corrugations of said second shell contacting said sleeve to form second set of ducts concentrically disposed around the ducts formed by the corrugations of the inner shell, and passage means at the juncture of the tailpipe nd the forward end of the nozzle in flow communication with the ducts of said second set.

17. A system as claimed in claim 12; said shell being formed as continuation of said tailpipe; and the forward end of said nozzle being spaced inwardly from the forward end of said shell to define an annular passage for the flow of gas from said tailpipe to the interior of said shell.

18. A method of decreasing the level of turbulence and the size of eddies in the turbulent boundary layer of an expanding jetstream discharged from the nozzle of a jet engine, comprising: directing a multiplicity of small jets of gas rearwardly in a ring surrounding the jetstream on interception courses with the jetstream boundary and producing small eddy turbulence therewith prior to shearing engagement of the jetstream boundary with free stream air, the velocity of the jets of gas intermediate between the velocity of tee jetstream and the velocity of the free stream air to define two-spaced mixing zones, in each of which the sound energy is substantially less than that produced by direct shearing engagement between the jetstream and free stream air.